United States Patent
Lilly et al.

(10) Patent No.: US 12,551,268 B2
(45) Date of Patent: Feb. 17, 2026

(54) MINIMALLY INVASIVE BLEB FORMATION DEVICES AND METHODS FOR USING SUCH DEVICES

(71) Applicant: Shifamed Holdings, LLC, Campbell, CA (US)

(72) Inventors: Richard Lilly, San Jose, CA (US);
Claudio Argento, Fulton, CA (US);
Alice Yang, Campbell, CA (US);
Katherine Sapozhnikov, Campbell, CA (US)

(73) Assignee: Shifamed Holdings, LLC, Campbell, CA (US)

( * ) Notice: Subject to any disclaimer, the term of this patent is extended or adjusted under 35 U.S.C. 154(b) by 867 days.

(21) Appl. No.: 17/625,630

(22) PCT Filed: Jul. 8, 2020

(86) PCT No.: PCT/US2020/041152
§ 371 (c)(1),
(2) Date: Jan. 7, 2022

(87) PCT Pub. No.: WO2021/007294
PCT Pub. Date: Jan. 14, 2021

(65) Prior Publication Data
US 2022/0249155 A1    Aug. 11, 2022

Related U.S. Application Data

(60) Provisional application No. 62/871,278, filed on Jul. 8, 2019.

(51) Int. Cl.
*A61B 18/14*    (2006.01)
*A61F 9/00*    (2006.01)
(Continued)

(52) U.S. Cl.
CPC ........ *A61B 18/1477* (2013.01); *A61F 9/0008* (2013.01); *A61F 9/00781* (2013.01);
(Continued)

(58) Field of Classification Search
CPC ...... A61B 18/1477; A61B 2018/00321; A61B 2018/00595; A61B 2018/1407;
(Continued)

(56) References Cited

U.S. PATENT DOCUMENTS

| 5,070,697 A | 12/1991 | Van Zeggeren |
| 5,123,906 A | 6/1992 | Kelman |

(Continued)

FOREIGN PATENT DOCUMENTS

| AU | 2014200171 | 1/2014 |
| AU | 2014201621 B2 | 3/2016 |

(Continued)

OTHER PUBLICATIONS

International Search Report and Written Opinion received for PCT Application No. PCT/US20/41152, filed on Jul. 8, 2020, Applicant: Shifamed Holdings, LLC, Date of Mailing: Oct. 28, 2020, 13 pages.

(Continued)

*Primary Examiner* — Tigist S Demie
(74) *Attorney, Agent, or Firm* — Perkins Cole LLP

(57) ABSTRACT

The present technology provides systems, devices, and methods for forming blebs to treat ocular hypertension or glaucoma. In some embodiments, a minimally invasive bleb formation device comprises an introducer sheath having a lumen extending longitudinally therethrough. The lumen has a distal end aperture insertable adjacent to a target tissue. The device further includes a wire positionable within the lumen of the introducer sheath. The wire has a first end portion, a second end portion, and an intermediate region between the first end portion and the second end portion. At (Continued)

least a segment of the intermediate portion is configured to extend through the distal end aperture to form a wire loop. The wire loop is moveable between a plurality of positions and is configured to disrupt and cauterize the target tissue.

10 Claims, 20 Drawing Sheets

(51) Int. Cl.
*A61F 9/007* (2006.01)
*A61F 9/008* (2006.01)
*A61B 18/00* (2006.01)

(52) U.S. Cl.
CPC .............. *A61F 9/00821* (2013.01); *A61B 2018/00321* (2013.01); *A61B 2018/00595* (2013.01); *A61B 2018/1407* (2013.01); *A61B 2018/1475* (2013.01); *A61F 2009/00868* (2013.01); *A61F 2009/00891* (2013.01)

(58) Field of Classification Search
CPC ... A61B 2018/1475; A61F 2009/00868; A61F 2009/00891; A61F 9/0008; A61F 9/00781; A61F 9/00821
See application file for complete search history.

(56) References Cited

U.S. PATENT DOCUMENTS

| | | |
|---|---|---|
| 5,178,604 A | 1/1993 | Baerveldt et al. |
| 6,007,511 A * | 12/1999 | Prywes .............. A61F 9/00781 604/9 |
| 6,077,299 A | 6/2000 | Adelberg et al. |
| 6,450,984 B1 | 9/2002 | Lynch et al. |
| 6,508,779 B1 | 1/2003 | Suson |
| 6,626,858 B2 | 9/2003 | Lynch et al. |
| 6,638,239 B1 | 10/2003 | Bergheim et al. |
| 6,666,841 B2 | 12/2003 | Gharib et al. |
| 6,736,791 B1 | 5/2004 | Tu et al. |
| 7,207,965 B2 | 4/2007 | Simon |
| 7,354,416 B2 | 4/2008 | Quiroz-Mereado et al. |
| 7,458,953 B2 | 12/2008 | Peyman |
| 7,699,882 B2 | 4/2010 | Stamper et al. |
| 7,717,872 B2 | 5/2010 | Shetty |
| 7,947,008 B2 | 5/2011 | Grahn et al. |
| 8,012,134 B2 | 9/2011 | Claude et al. |
| 8,298,240 B2 | 10/2012 | Giger et al. |
| 8,308,701 B2 | 11/2012 | Horvath et al. |
| 8,506,515 B2 | 8/2013 | Burns et al. |
| 8,540,659 B2 | 9/2013 | Berlin |
| 8,585,629 B2 | 11/2013 | Grabner et al. |
| 8,663,303 B2 | 3/2014 | Horvath et al. |
| 8,721,702 B2 | 5/2014 | Romoda et al. |
| 8,753,305 B2 | 6/2014 | Field et al. |
| 8,758,290 B2 | 6/2014 | Horvath et al. |
| 8,765,210 B2 | 7/2014 | Romoda et al. |
| 8,771,220 B2 | 7/2014 | Nissan et al. |
| 8,801,766 B2 | 8/2014 | Reitsamer et al. |
| 8,828,070 B2 | 9/2014 | Romoda et al. |
| 8,852,136 B2 | 10/2014 | Horvath et al. |
| 8,852,137 B2 | 10/2014 | Horvath et al. |
| 8,852,256 B2 | 10/2014 | Horvath et al. |
| 8,882,781 B2 | 11/2014 | Smedley et al. |
| 8,915,877 B2 | 12/2014 | Cunningham et al. |
| 8,974,511 B2 | 3/2015 | Horvath et al. |
| 9,017,276 B2 | 4/2015 | Horvath et al. |
| 9,095,411 B2 | 8/2015 | Horvath et al. |
| 9,095,413 B2 | 8/2015 | Romoda et al. |
| 9,113,994 B2 | 8/2015 | Horvath et al. |
| 9,125,723 B2 | 9/2015 | Horvath et al. |
| 9,192,516 B2 | 11/2015 | Horvath et al. |
| 9,226,851 B2 | 1/2016 | Gunn |
| 9,271,869 B2 | 3/2016 | Horvath et al. |
| 9,283,116 B2 | 3/2016 | Romoda et al. |
| 9,326,891 B2 | 5/2016 | Horvath et al. |
| 9,375,347 B2 | 6/2016 | Stergiopulos |
| 9,393,153 B2 | 7/2016 | Horvath et al. |
| 9,585,789 B2 | 3/2017 | Silvestrini et al. |
| 9,585,790 B2 | 3/2017 | Horvath et al. |
| 9,592,154 B2 | 3/2017 | Romoda et al. |
| 9,610,195 B2 | 4/2017 | Horvath |
| 9,636,254 B2 | 5/2017 | Yu et al. |
| 9,655,778 B2 | 5/2017 | Tyler |
| 9,655,779 B2 | 5/2017 | Bigler et al. |
| 9,693,900 B2 | 7/2017 | Gallardo Inzunza |
| 9,693,901 B2 | 7/2017 | Horvath et al. |
| 9,757,276 B2 | 9/2017 | Penhasi |
| 9,808,373 B2 | 11/2017 | Horvath et al. |
| 9,877,866 B2 | 1/2018 | Horvath et al. |
| 9,883,969 B2 | 2/2018 | Horvath et al. |
| 9,980,854 B2 | 5/2018 | Horvath et al. |
| 10,004,638 B2 | 6/2018 | Romoda et al. |
| 10,080,682 B2 | 9/2018 | Horvath et al. |
| 10,085,884 B2 | 10/2018 | Reitsamer et al. |
| 10,154,924 B2 | 12/2018 | Clauson et al. |
| 10,159,600 B2 | 12/2018 | Horvath et al. |
| 10,195,078 B2 | 2/2019 | Horvath et al. |
| 10,195,079 B2 | 2/2019 | Horvath et al. |
| 10,231,871 B2 | 3/2019 | Hill |
| 10,238,536 B2 | 3/2019 | Olson et al. |
| 10,285,853 B2 | 5/2019 | Rangel-Friedman et al. |
| 10,307,293 B2 | 6/2019 | Horvath et al. |
| 10,314,743 B2 | 6/2019 | Romoda et al. |
| 10,322,267 B2 | 6/2019 | Hakim |
| 10,335,030 B2 | 7/2019 | Alhourani |
| 10,342,703 B2 | 7/2019 | Siewert et al. |
| 10,363,168 B2 | 7/2019 | Schieber et al. |
| 10,369,048 B2 | 8/2019 | Horvath et al. |
| 10,405,903 B1 | 9/2019 | Biesinger et al. |
| 10,463,537 B2 | 11/2019 | Horvath et al. |
| 10,470,927 B2 | 11/2019 | Horvath et al. |
| 10,492,948 B2 | 12/2019 | Baerveldt |
| 10,524,958 B2 | 1/2020 | Camras et al. |
| 10,524,959 B2 | 1/2020 | Horvath |
| 10,596,035 B2 | 3/2020 | Stergiopulos et al. |
| 10,758,412 B2 | 9/2020 | Velasquez |
| 10,912,675 B2 | 2/2021 | Lubatschowski |
| 10,952,897 B1 | 3/2021 | Smith |
| 10,960,074 B2 | 3/2021 | Berdahl |
| 11,039,954 B2 | 6/2021 | Cohen et al. |
| 11,065,154 B1 | 7/2021 | Sponsel et al. |
| 11,083,624 B2 | 8/2021 | Stein et al. |
| 11,122,975 B2 | 9/2021 | Rodger et al. |
| 11,166,847 B2 | 11/2021 | Badawi et al. |
| 11,166,849 B2 | 11/2021 | Mixter et al. |
| 2002/0156413 A1 | 10/2002 | Williams et al. |
| 2002/0177891 A1 | 11/2002 | Miles et al. |
| 2002/0193725 A1 | 12/2002 | Odrich |
| 2003/0127090 A1 | 7/2003 | Gifford et al. |
| 2003/0183008 A1 | 10/2003 | Bang et al. |
| 2004/0010219 A1 | 1/2004 | McCusker et al. |
| 2004/0190153 A1 | 9/2004 | Esch |
| 2004/0254520 A1 | 12/2004 | Porteous et al. |
| 2005/0049578 A1 | 3/2005 | Tu et al. |
| 2005/0059956 A1 | 3/2005 | Varner et al. |
| 2005/0196424 A1 | 9/2005 | Chappa |
| 2006/0069340 A1 | 3/2006 | Simon |
| 2007/0010837 A1 | 1/2007 | Tanaka |
| 2007/0078371 A1 | 4/2007 | Brown et al. |
| 2007/0088432 A1 | 4/2007 | Solovay et al. |
| 2007/0299487 A1 | 12/2007 | Shadduck |
| 2008/0119891 A1 | 5/2008 | Miles et al. |
| 2009/0043321 A1 | 2/2009 | Conston et al. |
| 2009/0243956 A1 | 10/2009 | Keilman et al. |
| 2010/0234791 A1 | 9/2010 | Lynch et al. |
| 2011/0054470 A1 * | 3/2011 | Weitzner ............ A61B 18/1482 606/48 |
| 2012/0065570 A1 | 3/2012 | Yeung et al. |
| 2012/0143118 A1 | 6/2012 | Karageozian |
| 2013/0131577 A1 | 5/2013 | Bronstein et al. |
| 2013/0197621 A1 | 8/2013 | Ryan et al. |
| 2013/0211312 A1 | 8/2013 | Gelvin |

(56) References Cited

U.S. PATENT DOCUMENTS

| | | |
|---|---|---|
| 2013/0267887 A1 | 10/2013 | Kahook et al. |
| 2014/0276809 A1* | 9/2014 | Smith .............. A61B 17/32056 606/113 |
| 2015/0011926 A1 | 1/2015 | Reitsamer et al. |
| 2015/0034217 A1 | 2/2015 | Vad |
| 2015/0094641 A1 | 4/2015 | Park et al. |
| 2015/0230843 A1 | 8/2015 | Palmer et al. |
| 2015/0265469 A1 | 9/2015 | Olson et al. |
| 2016/0151179 A1 | 6/2016 | Favier et al. |
| 2016/0256317 A1 | 9/2016 | Horvath et al. |
| 2016/0256318 A1 | 9/2016 | Horvath et al. |
| 2016/0256319 A1 | 9/2016 | Horvath et al. |
| 2016/0256320 A1 | 9/2016 | Horvath et al. |
| 2016/0296371 A1* | 10/2016 | Gelvin ................ A61F 9/00781 |
| 2016/0354244 A1 | 12/2016 | Horvath et al. |
| 2016/0354245 A1 | 12/2016 | Horvath et al. |
| 2017/0027582 A1 | 2/2017 | Khoury et al. |
| 2017/0049471 A1* | 2/2017 | Gaffney ........... A61B 17/32002 |
| 2017/0071791 A1 | 3/2017 | Piven |
| 2017/0172797 A1 | 6/2017 | Horvath et al. |
| 2017/0172798 A1 | 6/2017 | Horvath et al. |
| 2017/0172799 A1 | 6/2017 | Horvath |
| 2017/0312125 A1 | 11/2017 | Clauson et al. |
| 2017/0348150 A1 | 12/2017 | Horvath et al. |
| 2018/0014828 A1 | 1/2018 | Fonte et al. |
| 2018/0028361 A1 | 2/2018 | Haffner et al. |
| 2018/0092775 A1 | 4/2018 | de Juan, Jr. et al. |
| 2018/0147089 A1 | 5/2018 | Horvath et al. |
| 2018/0177633 A1 | 6/2018 | Haffner et al. |
| 2018/0206878 A1 | 7/2018 | Uspenski et al. |
| 2018/0250166 A1 | 9/2018 | Lubatschowski |
| 2018/0333296 A1 | 11/2018 | Heitzmann et al. |
| 2019/0000673 A1 | 1/2019 | Fjield et al. |
| 2019/0021907 A1 | 1/2019 | Horvath et al. |
| 2019/0038462 A1 | 2/2019 | Vandiest et al. |
| 2019/0046356 A1 | 2/2019 | Laroche |
| 2019/0060118 A1 | 2/2019 | Hill |
| 2019/0133826 A1 | 5/2019 | Horvath et al. |
| 2019/0142632 A1 | 5/2019 | Badawi et al. |
| 2019/0151079 A1 | 5/2019 | Zaldivar |
| 2019/0167475 A1 | 6/2019 | Horvath et al. |
| 2019/0240069 A1 | 8/2019 | Horvath et al. |
| 2019/0274881 A1 | 9/2019 | Romoda et al. |
| 2019/0274882 A1 | 9/2019 | Romoda et al. |
| 2019/0307608 A1 | 10/2019 | Lee et al. |
| 2019/0344057 A1 | 11/2019 | Cima et al. |
| 2019/0350758 A1 | 11/2019 | Horvath et al. |
| 2019/0358086 A1 | 11/2019 | Camras et al. |
| 2019/0374384 A1 | 12/2019 | Xie et al. |
| 2020/0069469 A1 | 3/2020 | Horvath et al. |
| 2020/0085620 A1 | 3/2020 | Euteneuer et al. |
| 2020/0121503 A1 | 4/2020 | Badawi et al. |
| 2020/0121504 A1 | 4/2020 | Stegmann et al. |
| 2020/0170839 A1 | 6/2020 | Borrmann et al. |
| 2020/0179171 A1 | 6/2020 | Crimaldi et al. |
| 2020/0214891 A1 | 7/2020 | Bigler et al. |
| 2020/0229980 A1 | 7/2020 | Horvath |
| 2020/0246188 A1 | 8/2020 | Horvath et al. |
| 2020/0253725 A1 | 8/2020 | Hadba et al. |
| 2020/0261271 A1 | 8/2020 | Horvath et al. |
| 2020/0276050 A1 | 9/2020 | Simons et al. |
| 2020/0306086 A1 | 10/2020 | Da Silva Curiel et al. |
| 2020/0345549 A1 | 11/2020 | Lu et al. |
| 2021/0015665 A1 | 1/2021 | Hacker et al. |
| 2021/0030590 A1 | 2/2021 | Blanda et al. |
| 2021/0038158 A1 | 2/2021 | Haffner et al. |
| 2021/0069486 A1 | 3/2021 | Hakim |
| 2021/0106462 A1 | 4/2021 | Sherwood et al. |
| 2021/0128357 A1 | 5/2021 | de Juan, Jr. et al. |
| 2021/0137736 A1 | 5/2021 | Cavuto et al. |
| 2021/0161713 A1 | 6/2021 | Bouremel et al. |
| 2021/0196516 A1 | 7/2021 | Ianchulev |
| 2021/0205132 A1 | 7/2021 | Horvath et al. |
| 2021/0212858 A1 | 7/2021 | Tran et al. |
| 2021/0298948 A1 | 9/2021 | Haffner et al. |
| 2021/0315806 A1 | 10/2021 | Haffner |
| 2021/0330499 A1 | 10/2021 | Wardle et al. |
| 2021/0338406 A1 | 11/2021 | Bayat et al. |
| 2022/0168146 A1 | 6/2022 | Badawi et al. |
| 2022/0241565 A1 | 8/2022 | Nae et al. |
| 2022/0273491 A1 | 9/2022 | Brown |
| 2022/0354695 A1 | 11/2022 | Badawi et al. |

FOREIGN PATENT DOCUMENTS

| | | |
|---|---|---|
| AU | 2016201445 B2 | 3/2016 |
| AU | 2018200325 A1 | 2/2018 |
| AU | 2017274654 | 12/2018 |
| AU | 2020201818 | 4/2020 |
| AU | 2017439185 | 5/2020 |
| AU | 2018412569 | 10/2020 |
| BR | 112017025859 A2 | 8/2018 |
| BR | 112020008969 | 10/2020 |
| CA | 2987953 A1 | 12/2016 |
| CA | 3080713 | 5/2019 |
| CA | 3093160 | 9/2019 |
| CN | 108743016 A | 11/2018 |
| CN | 111405875 | 7/2020 |
| CO | 2020011460 | 11/2020 |
| DE | 10217061 | 3/2003 |
| EP | 1292256 A1 | 3/2003 |
| EP | 1737531 A2 | 1/2007 |
| EP | 3302381 A1 | 4/2018 |
| EP | 1765234 | 10/2019 |
| EP | 2999430 | 11/2019 |
| EP | 2677981 | 4/2020 |
| EP | 3659495 | 6/2020 |
| EP | 3518846 | 8/2020 |
| EP | 3666236 | 8/2020 |
| EP | 3687374 | 8/2020 |
| EP | 3706653 | 9/2020 |
| EP | 3730104 | 10/2020 |
| EP | 3735947 | 11/2020 |
| EP | 3773377 | 2/2021 |
| EP | 3846747 | 7/2021 |
| EP | 3846748 | 7/2021 |
| EP | 3329884 | 8/2021 |
| EP | 2389138 | 9/2021 |
| EP | 3870120 | 9/2021 |
| EP | 3313335 | 11/2021 |
| ES | 2725550 | 9/2019 |
| HK | 1252748 | 5/2019 |
| HU | E043303 | 8/2019 |
| JP | 2018519892 | 7/2018 |
| JP | 2018130580 | 8/2018 |
| JP | 2019517366 | 6/2019 |
| JP | 2019205934 | 12/2019 |
| JP | 2020049361 | 4/2020 |
| KR | 2018015684 A | 2/2018 |
| KR | 20190019966 | 2/2019 |
| KR | 20200021551 | 2/2020 |
| KR | 20200059305 | 5/2020 |
| PL | 2640455 | 8/2019 |
| PT | 2640455 | 5/2019 |
| RU | 2687764 | 5/2019 |
| RU | 2018142990 | 6/2020 |
| SG | 11202008604 | 10/2020 |
| TR | 201906873 | 6/2019 |
| WO | WO2014130574 | 8/2014 |
| WO | WO2016109639 | 7/2016 |
| WO | WO2016196841 A1 | 12/2016 |
| WO | WO2018229766 | 12/2018 |
| WO | WO2019094004 A1 | 5/2019 |
| WO | WO2019165053 | 8/2019 |
| WO | WO2019172940 | 9/2019 |
| WO | WO2020049508 | 3/2020 |
| WO | WO2020150663 | 7/2020 |
| WO | WO2020215068 | 10/2020 |
| WO | WO2020223491 | 11/2020 |
| WO | WO2020231993 | 11/2020 |
| WO | WO2020247365 | 12/2020 |
| WO | WO2020261184 | 12/2020 |
| WO | WO2021028703 | 2/2021 |
| WO | WO2021068078 | 4/2021 |

(56) References Cited

FOREIGN PATENT DOCUMENTS

| WO | WO2021113730 | 6/2021 |
|---|---|---|
| WO | WO2021142255 | 7/2021 |
| WO | WO2021163566 | 8/2021 |
| WO | WO2021168130 | 8/2021 |
| WO | WO2021174298 | 9/2021 |
| WO | WO2021176332 | 9/2021 |
| WO | WO2021204312 | 10/2021 |
| WO | WO2021230887 | 11/2021 |
| WO | WO2022175681 | 8/2022 |
| ZA | 201708295 | 5/2020 |

OTHER PUBLICATIONS

Savory et al. "Gore Glaucoma Drainage Device Concept," 2024 Glaucoma Surgical Device Market Report, 1 page.

Munhoz et al., "Breast Implant Surfaces and Their Impact on Current Practices: Where We Are Now and Where Are We Going?" PRS Global Open 2019, 12 pages.

Kim et al. "Mechanosensitivity of fibroblast cell shape and movement to anisotropic substratum topography gradients," Biomaterials, 30(29), 5433-5444, Jul. 11, 2009, [Retrieved Nov. 14, 2024]. Retrieved from internet: <URL: https://doi.Org/10.1016/j.biomaterials.2009.06.042>, 12 pages.

International Search Report and Written Opinion received for PCT Application No. PCT/US2024/045624, Applicant: Shifamed Holdings, LLC, Date of Mailing: Jan. 8, 2025, 18 pages.

\* cited by examiner

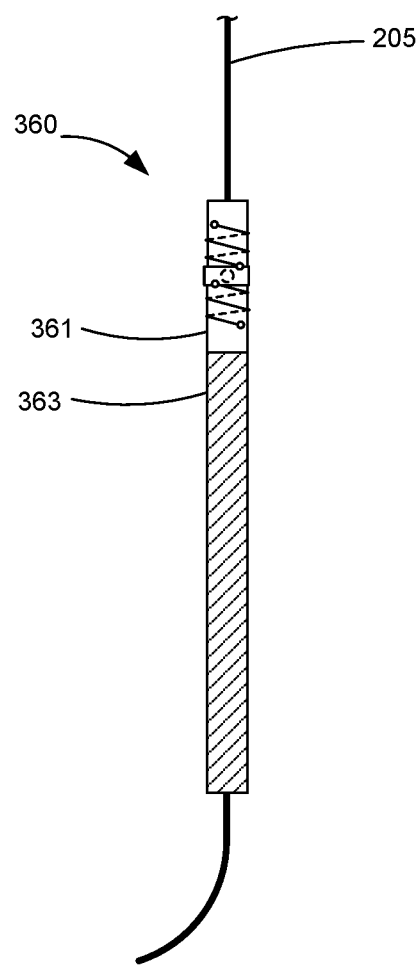 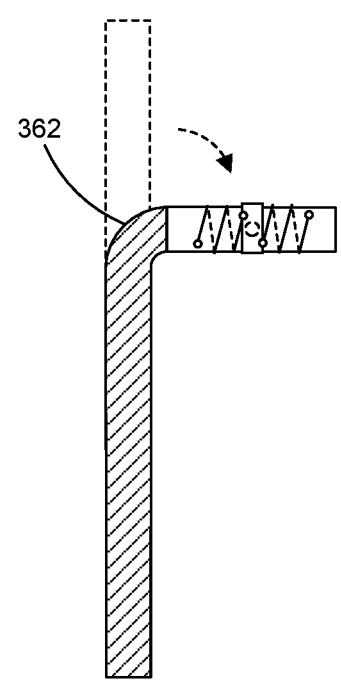
*FIG. 17A*  *FIG. 17B*

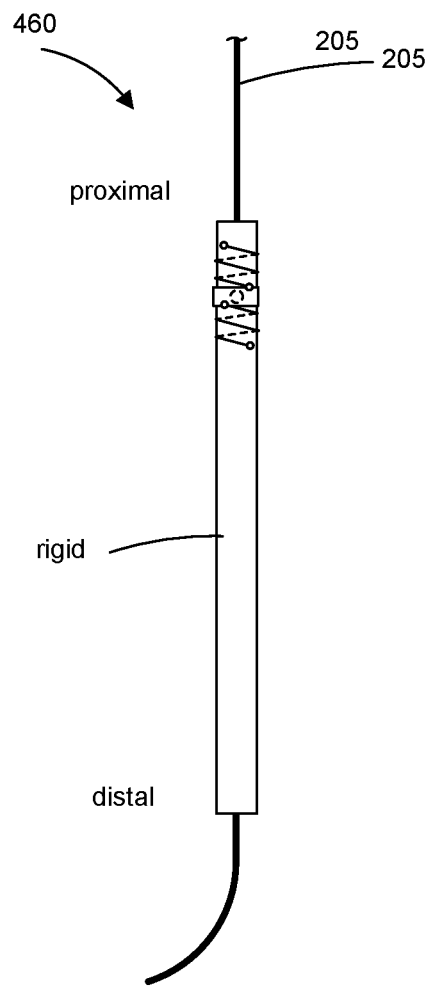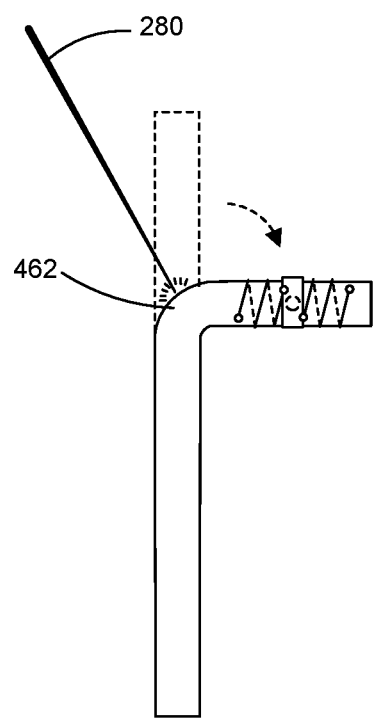
*FIG. 18A*  *FIG. 18B*

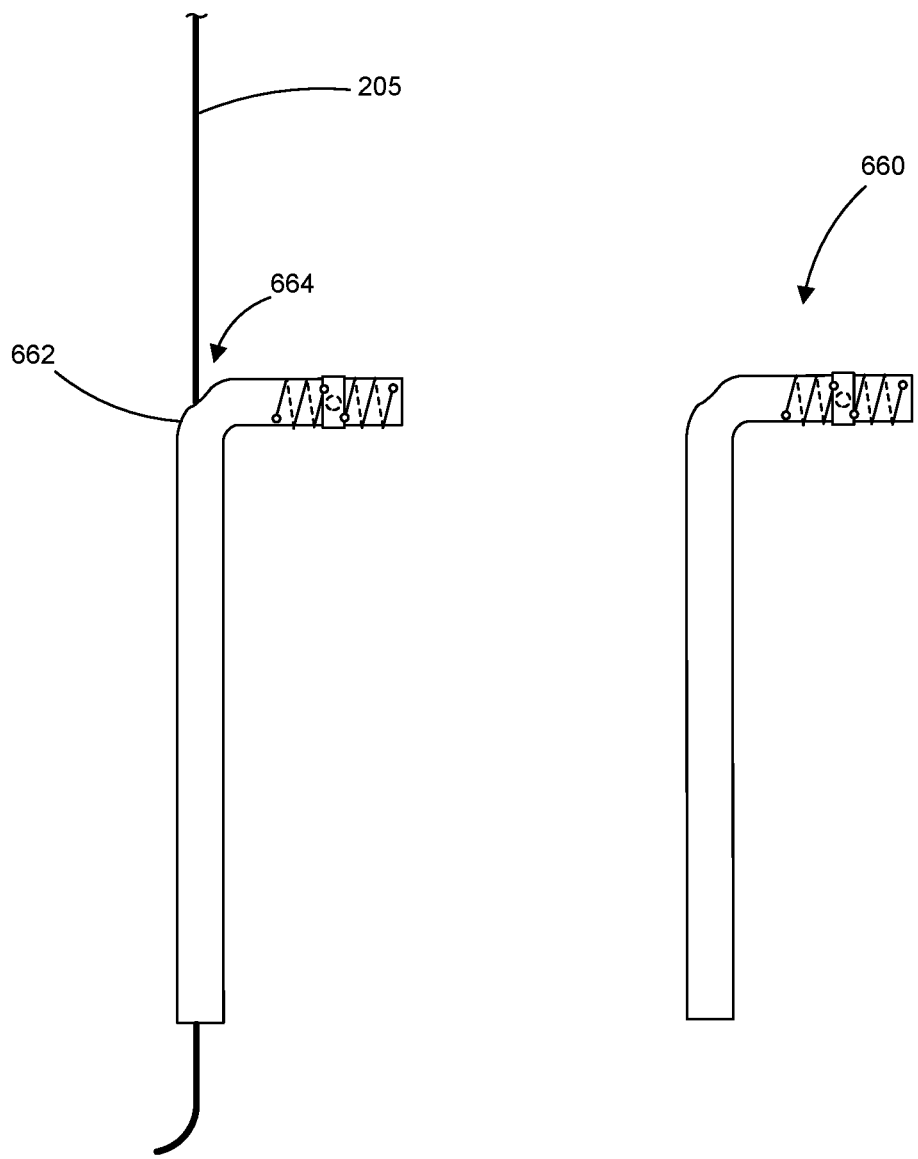
*FIG. 20A*  *FIG. 20B*

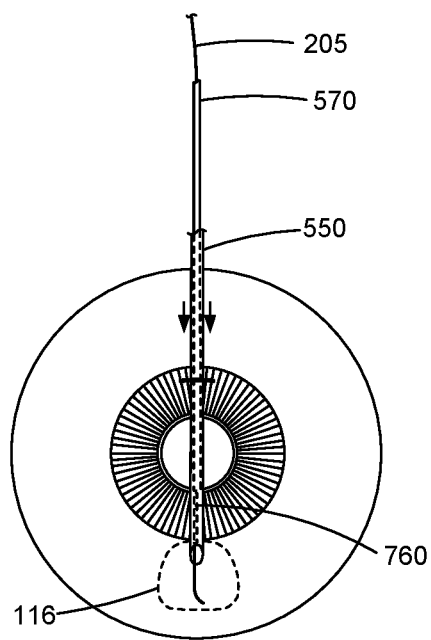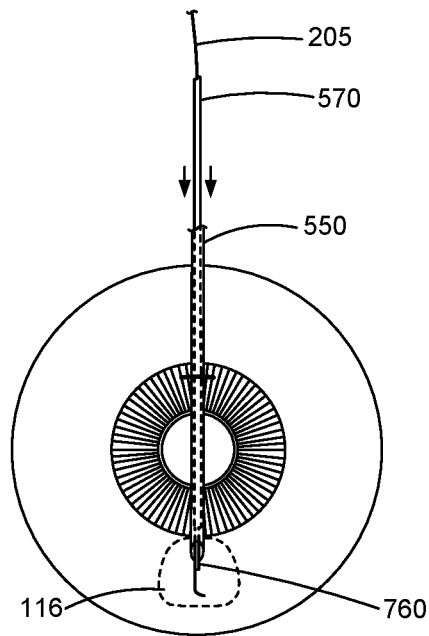
*FIG. 22A* *FIG. 22B*
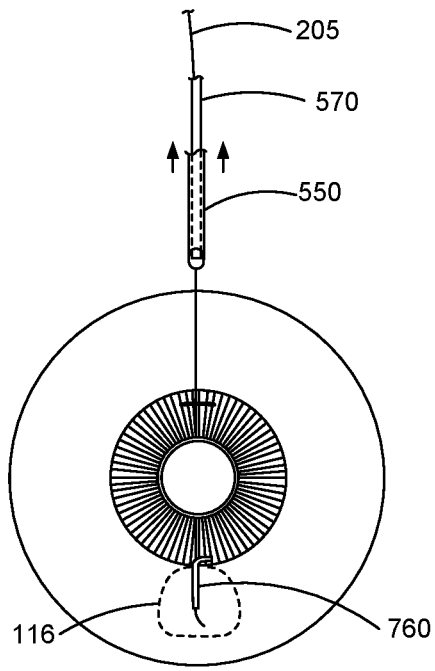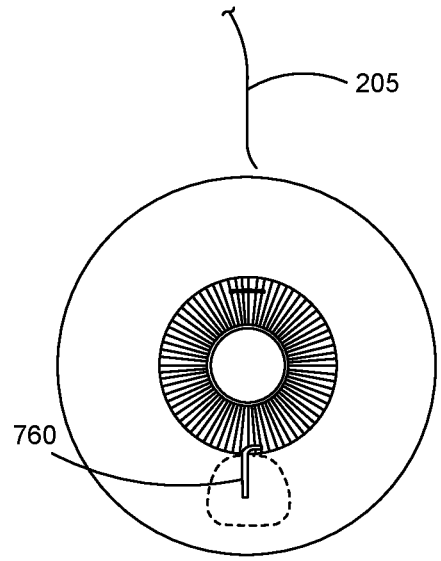
*FIG. 22C* *FIG. 22D*

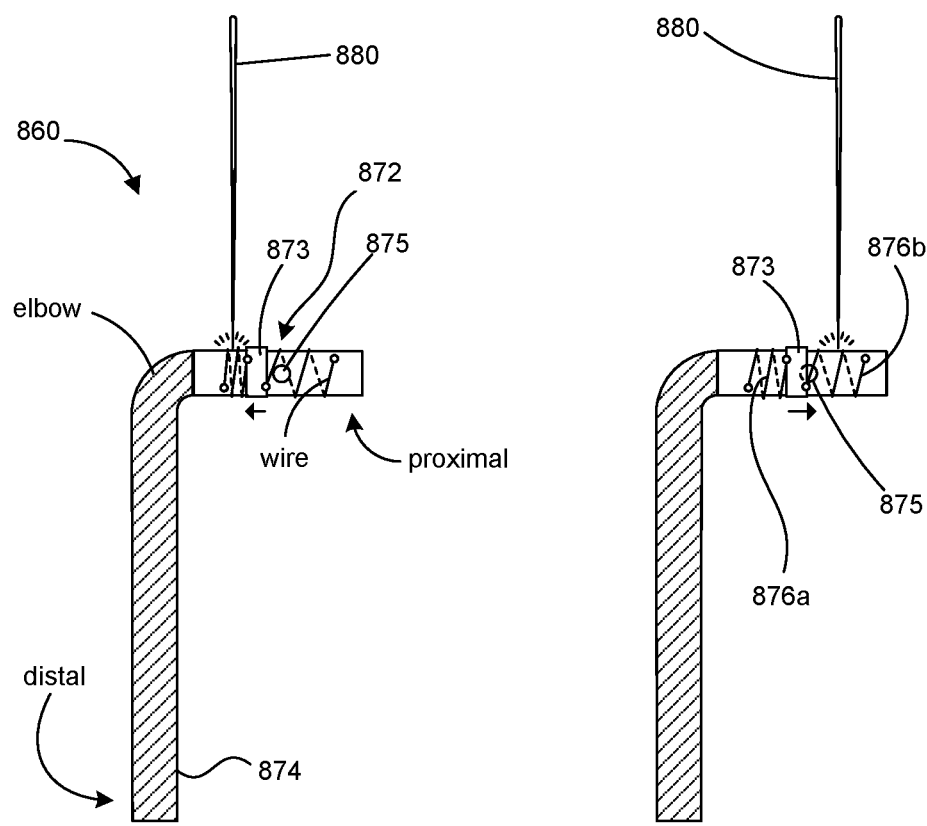
*FIG. 23A*  *FIG. 23B*

MINIMALLY INVASIVE BLEB FORMATION DEVICES AND METHODS FOR USING SUCH DEVICES

CROSS-REFERENCE TO RELATED APPLICATION(S)

This application is a 35 U.S.C. § 371 U.S. National Phase application of International Patent Application No. PCT/US2020/041152, filed Jul. 8, 2020, and titled MINIMALLY INVASIVE BLEB FORMATION DEVICES AND METHODS FOR USING SUCH DEVICES, which claims priority to U.S. Provisional Patent Application No. 62/871,278, filed Jul. 8, 2019, the disclosures of which are incorporated herein by reference in their entireties.

TECHNICAL FIELD

The present technology generally relates to minimally invasive bleb formation tools and methods for using such devices to treat ocular hypertension and/or glaucoma.

BACKGROUND

Glaucoma is a degenerative ocular condition involving damage to the optic nerve that can cause progressive and irreversible vision loss. Glaucoma is frequently associated with ocular hypertension, an increase in pressure within the eye, and may result from an increase in production of aqueous humor ("aqueous") within the eye and/or a decrease in the rate of outflow of aqueous from within the eye into the blood stream. Aqueous is produced in the ciliary body at the boundary of the posterior and anterior chambers of the eye. It flows into the anterior chamber and eventually into the capillary bed in the sclera of the eye. Glaucoma is typically caused by a failure in mechanisms that transport aqueous out of the eye and into the blood stream.

BRIEF DESCRIPTION OF THE DRAWINGS

Many aspects of the present technology can be better understood with reference to the following drawings. The components in the drawings are not necessarily drawn to scale. Instead, emphasis is placed on illustrating clearly the principles of the present technology. Furthermore, components can be shown as transparent in certain views for clarity of illustration only and not to indicate that the component is necessarily transparent. Components may also be shown schematically.

FIGS. 17A and 17B illustrate a delivery configuration and a deployed configuration, respectively, of a shunt configured in accordance with embodiments of the present technology.

FIGS. 18A and 18B illustrate a delivery configuration and a deployed configuration, respectively, of a shunt configured in accordance with embodiments of the present technology.

FIGS. 20A and 20B illustrate an L-shaped shunt configured in accordance with embodiments of the present technology.

FIGS. 22A-22D illustrate a method for delivering a preformed L-shaped shunt in accordance with embodiments of the present technology.

FIGS. 23A and 23B illustrate an adjustable flow mechanism of a shunt configured in accordance with embodiments of the present technology.

DETAILED DESCRIPTION

Figure 1:
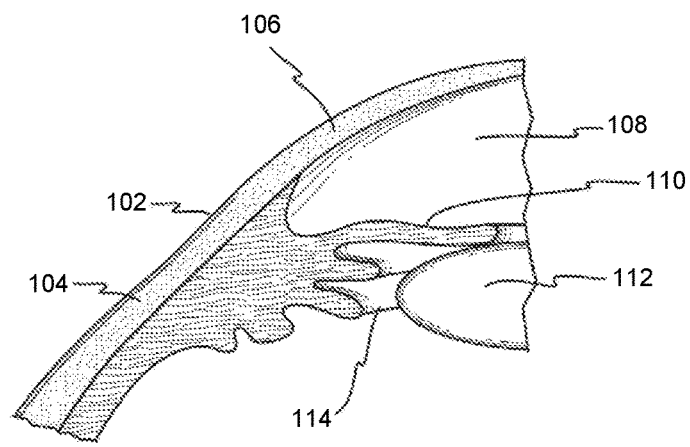
FIG. 1 is a partial cross-sectional view of a human eye.

The present technology is directed to minimally invasive bleb formation devices and methods of forming blebs using such devices. In many of the embodiments disclosed herein, the bleb formation device includes an introducer sheath and a wire. The wire extends through a lumen of the introducer sheath to contact target tissue. The wire is configured to (a) disrupt the tissue to form a bleb and (b) cauterize the disrupted tissue to minimize bleeding. Accordingly, the present technology is expected to eliminate the need to introduce separate tools to form the bleb and cauterize the tissue, thereby simplifying the procedure and significantly reducing procedure time.

In one embodiment, for example, a minimally invasive bleb tool comprises an introducer sheath having a lumen extending longitudinally therethrough. The lumen has a distal end aperture insertable adjacent to a target tissue. The bleb tool further includes a wire positionable within the lumen, the wire having a first end segment, a second end segment, and an intermediate segment between the first end segment and the second end segment. When in use (a) a portion of the first end segment and the second end segment reside within the lumen and (b) at least a portion of the intermediate segment extends through the distal end aperture to form a wire loop. The wire loop is configured to both disrupt and cauterize tissue. For example, the wire loop can at least partially disrupt tissue via mechanical means and at least partially cauterize tissue via electrical means.

A method for forming a bleb in the treatment of ocular hypertension or glaucoma in accordance with another embodiment of the present technology can include inserting an introducer sheath into an eye such that a distal end of the introducer sheath is adjacent a target region. The introducer sheath includes a lumen extending longitudinally therethrough. The method further includes deploying a wire through the lumen to contact the target region. The wire includes a first end segment, a second end segment, and an intermediate segment between the first end segment and the second end segment. When disrupting and cauterizing the target tissue, (a) at least a portion of the first end segment and a portion of the second end segment are in the lumen, and (b) at least a portion of the intermediate segment extends through the distal end aperture to form a wire loop in contact with the target tissue. The method further includes disrupting target tissue to form a bleb via the wire loop and cauterizing the target tissue by applying an electrical current to the disrupted target tissue via the wire loop.

The terminology used in the description presented below is intended to be interpreted in its broadest reasonable manner, even though it is being used in conjunction with a detailed description of certain specific embodiments of the present technology. Certain terms may even be emphasized below; however, any terminology intended to be interpreted in any restricted manner will be overtly and specifically defined as such in this Detailed Description section. Additionally, the present technology can include other embodiments that are within the scope of the claims but are not described in detail with respect to FIGS. 1-24B.

Reference throughout this specification to "one embodiment" or "an embodiment" means that a particular feature, structure or characteristic described in connection with the embodiment is included in at least one embodiment of the present technology. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

Reference throughout this specification to relative terms such as, for example, "substantially," "approximately," and "about" are used herein to mean the stated value plus or minus 10%.

Although certain embodiments herein are described in terms of shunting fluid from an anterior chamber of an eye, one of skill in the art will appreciate that the present technology can be readily adapted to shunt fluid from and/or between other portions of the eye. Moreover, while the certain embodiments herein are described in the context of glaucoma treatment, any of the embodiments herein, including those referred to as "glaucoma shunts," may nevertheless be used and/or modified to treat other diseases or conditions of the eye.

The headings provided herein are for convenience only and do not interpret the scope or meaning of the claimed present technology.

A. Select Embodiments of Bleb Formation Tools and Techniques

As noted above, glaucoma is a degenerative ocular condition characterized by an increase in pressure within the eye resulting from an increase in production of aqueous within the eye and/or a decrease in the rate of outflow of aqueous from within the eye into the blood stream. The early stages of glaucoma are typically treated with drugs (e.g., eye drops). When drug treatments no longer suffice, however, surgical 1 approaches can be used. Surgical or minimally invasive approaches primarily attempt to increase the outflow of aqueous from the anterior chamber to the blood stream either by the creation of alternative fluid paths or the augmentation of the natural paths for aqueous outflow. For example, a shunt defining a lumen can be surgically placed in fluid connection with the anterior chamber. In such shunt-based treatments for glaucoma, a drainage site called a "bleb" is formed. Aqueous from within the anterior chamber of the eye drains via a lumen defined within the shunt into the bleb. Blebs are typically created in subconjunctival tissue either above or below the capsule of tenons. Typical procedures used for the formation of blebs in the treatment of glaucoma require multiple incisions or punctures. The present technology, however, provides systems, devices, and methods for a less invasive procedure.

FIG. 1 is a partial cross-sectional view of a human eye illustrating select anatomy of a human eye. As illustrated, the conjunctiva 102 is the outermost layer of the eye, with the sclera 104 beneath. These transition into the cornea 106. Behind the cornea 106 is the anterior chamber 108, which is filled with aqueous humor and bordered by the iris 110. The lens 112 is connected to the ciliary body 114.

Figure 2A:
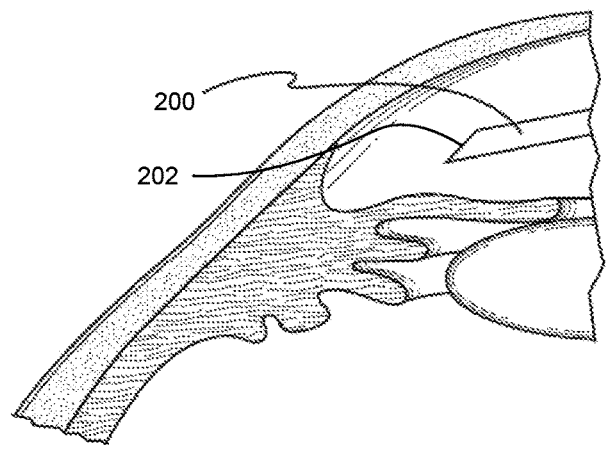
FIGS. 2A and 2B illustrate insertion of an introducer through the anterior chamber of the eye in accordance with embodiments of the present technology.
Figure 2B:
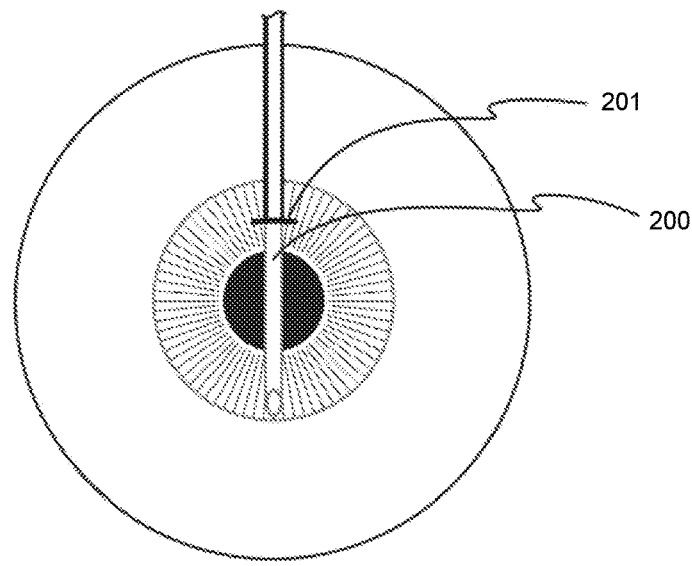

In some embodiments of the present technology, an introducer can be used to establish the target implant site and to create a bleb to which aqueous humor will drain. FIGS. 2A and 2B, for example, illustrate an ab-interno procedure. For example, the insertion of an introducer 200 occurs through an incision 201 in the cornea 106. In some embodiments, this incision is across the anterior chamber 108 from the final target implant site such that the introducer 200 may approach the site head-on. The introducer 200 is advanced through the anterior chamber 108, remaining anterior to the iris 110, as can be viewed in FIG. 2A. It penetrates the trabecular meshwork and tunnels through the sclera 104 to be positioned with its tip 202 at the subconjunctival space.

In other embodiments of the present technology, an ab-externo procedure is used to form the bleb and/or deploy the device. In such embodiments, an incision (not shown) is made in the sclera 104. The introducer 200 is inserted through the incision and tunnels through the sclera 104 until the tip 202 is in the subconjunctival space adjacent the anterior chamber 108. The introducer 200 can then be used to form the bleb using the technique described in detail below with respect to FIGS. 3A-9 and/or implant a shunt using a technique substantially similar to that described below with respect to FIGS. 10A-16B.

Figure 3A:
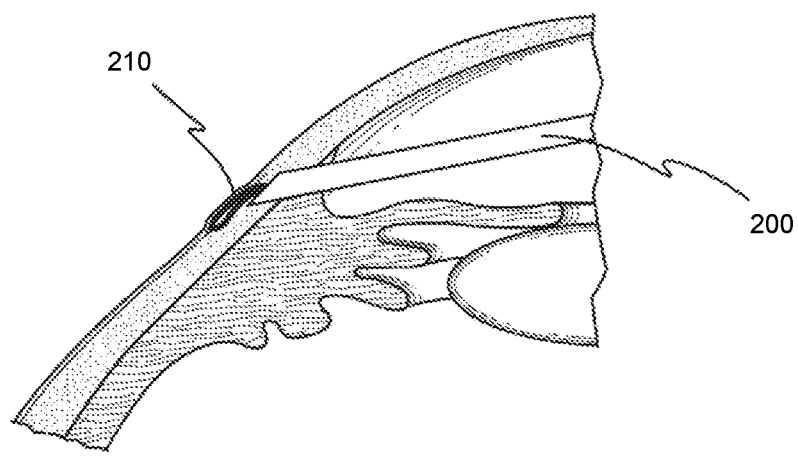
FIGS. 3A and 3B illustrate a wire loop extending beyond a distal end of the introducer and into the subconjunctival space in accordance with embodiments of the present technology.
Figure 3B:
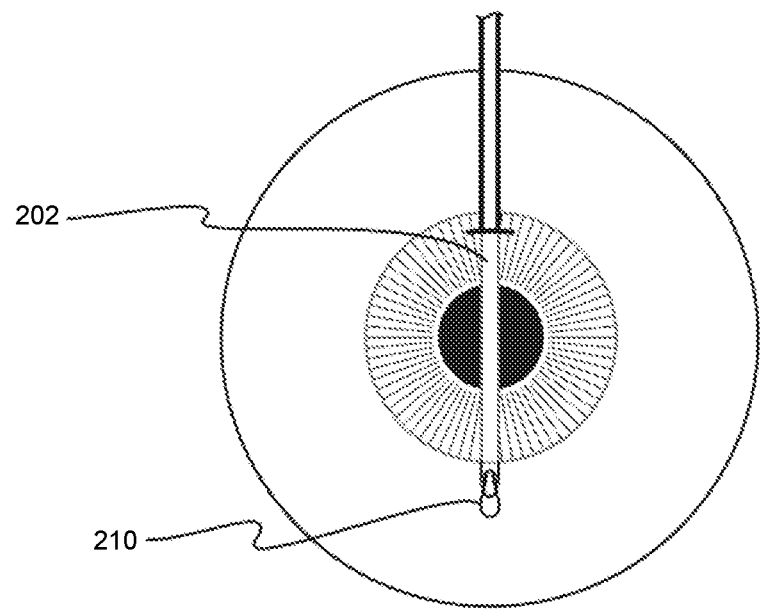
Figure 4A:
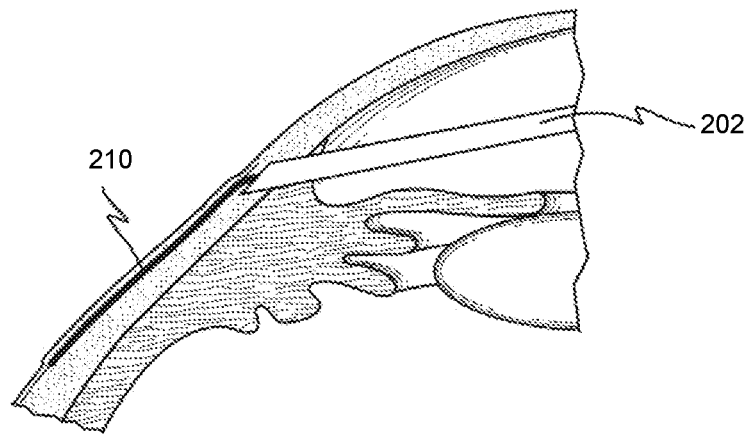
FIGS. 4A and 4B illustrate using the wire loop to form a bleb in accordance with embodiments of the present technology.
Figure 4B:
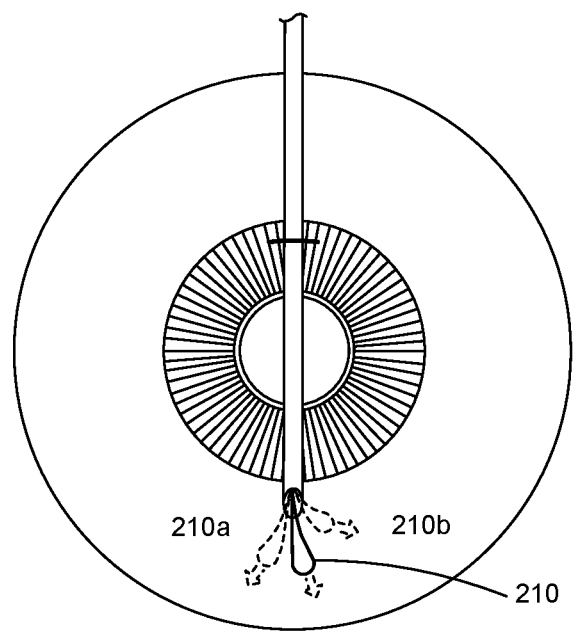

Referring first to FIGS. 3A and 3B, a wire loop 210 is advanced through the introducer 200 into the subconjunctival space. The wire loop 210 is used to create a blunt dissection of local tenons between the conjunctiva 102 and the sclera 104. This disrupts the connection of the conjunctiva 102 to the sclera 104 to facilitate formation of a bleb. Referring next to FIGS. 4A and 4B, the wire loop 210 can be agitated in multiple directions by manipulating the distal ends of the wire loop as a unit and individually. For example, pulling a first side (side A) 210a of the wire loop causes the end of loop to move laterally toward that side. Similarly, pulling a second side (side B) 210b of the wire loop causes the end of the loop to move laterally toward that opposite side. Moving the wire loop 210 back and forth separates the conjunctiva 102 from the sclera 104 and creates a bleb space for drainage of aqueous humor.

Figure 5:
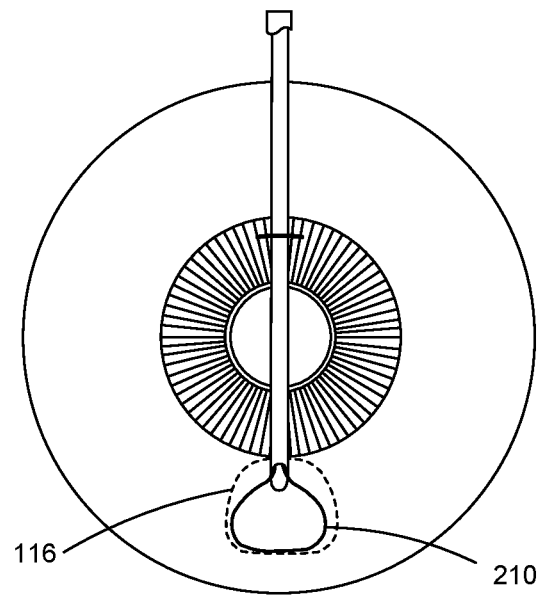
FIG. 5 illustrates the wire loop in an expanded configuration for cauterizing tissue surrounding a bleb in accordance with embodiments of the present technology.
Figure 6:
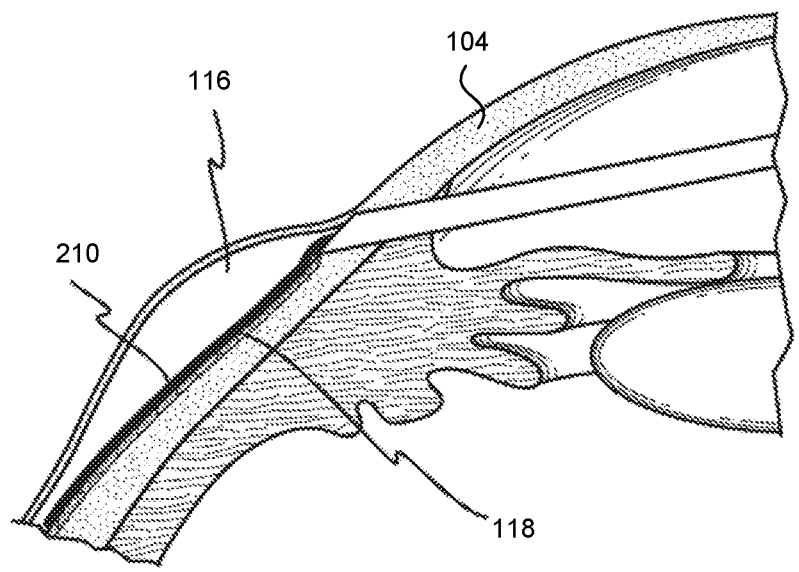
FIG. 6 illustrates the wire loop extending over a cauterized layer of tissue in accordance with embodiments of the present technology.
Figure 7A:
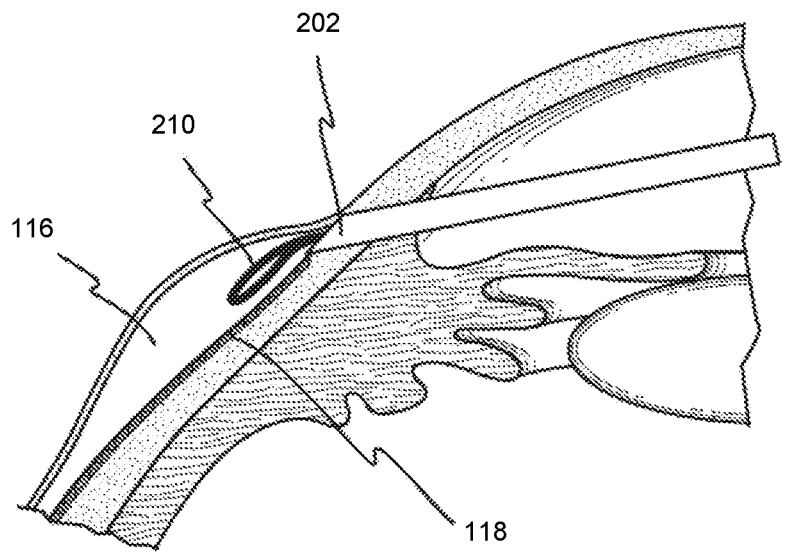
FIGS. 7A and 7B illustrate retracting the wire loop into the introducer following cauterization in accordance with embodiments of the present technology.
Figure 7B:
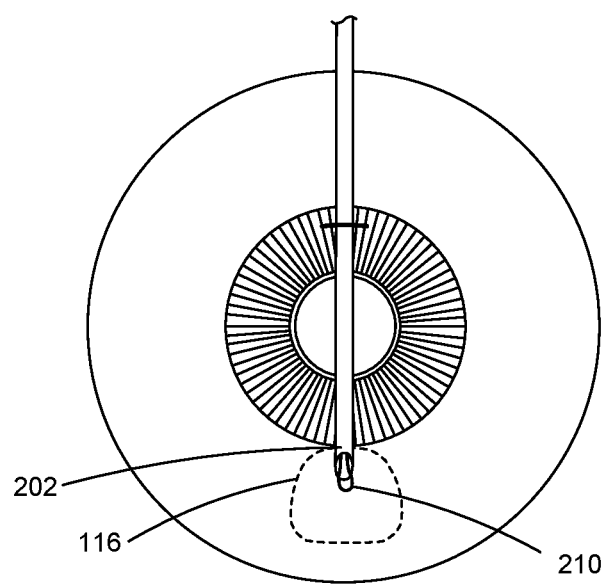

Following formation of the bleb, bleeding is typically minimized by cauterizing the tissue surrounding the bleb. In conventional systems, a separate cauterization tool is used. In many such systems, the cauterization tool is a separate entity from the tenon blunt dissection tool. In contrast with such conventional systems, the present technology provides minimally invasive bleb forming tools that are capable of both forming the bleb and cauterizing the tissue. FIG. 5, for example, shows the wire loop 210 in an expanded configuration and positioned to cauterize the area surrounding the bleb space 116 evenly. The same wire loop 210 is used for both bleb formation and cauterization. In such embodiments, all but the distal end of the wire loop 210 can be covered in an insulating material. Applying a current to the wire loop 210 can cauterize the local area. FIG. 6, for example, depicts a cauterized layer 118 of the sclera 104 in the bleb space 116. Referring next to FIGS. 7A-B, upon completion of cauterization, the wire loop 210 is retracted while the introducer tip 202 remains at the bleb entrance.

Figure 8:
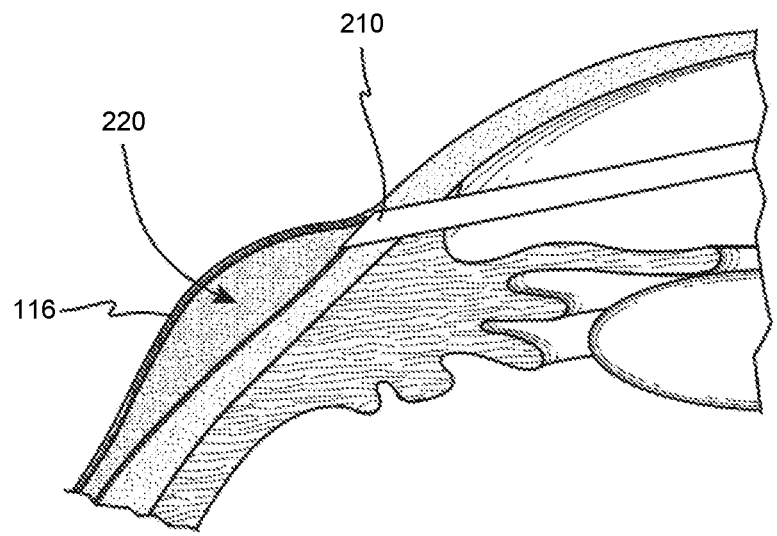
FIG. 8 illustrates introducing an anti-scarring agent into the bleb in accordance with embodiments of the present technology.
Figure 9:
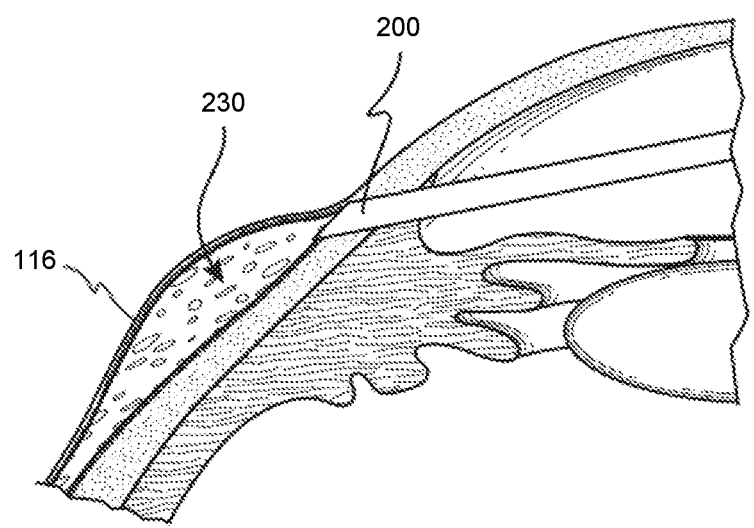
FIG. 9 illustrates flushing the bleb with saline in accordance with embodiments of the present technology.

Referring next to FIG. 8, an anti-scarring agent 220 can be introduced to encourage stabilization of the bleb space 116. In one embodiment, for example, mitomycin C (an antimetabolite) can be injected through the introducer 200. In other embodiments, however, alternative agents may be used. As shown in FIG. 9, the bleb space 116 is then flushed with saline 230.

Figure 10A:
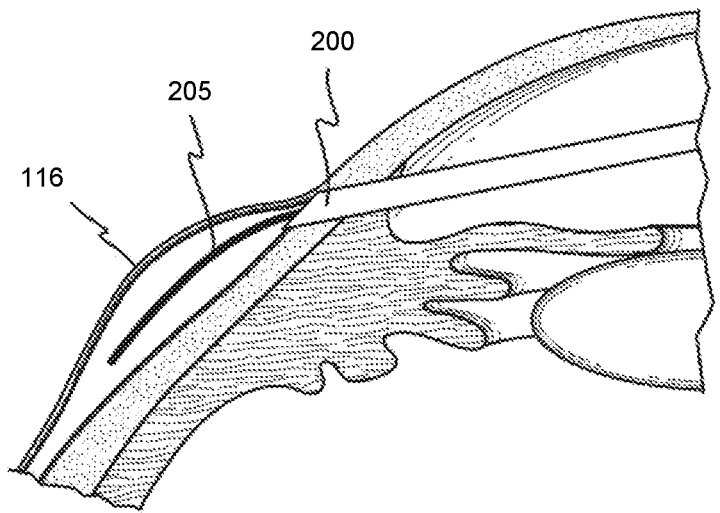
FIGS. 10A and 10B illustrate introducing a guidewire through the introducer and into the bleb in accordance with embodiments of the present technology.
Figure 10B:
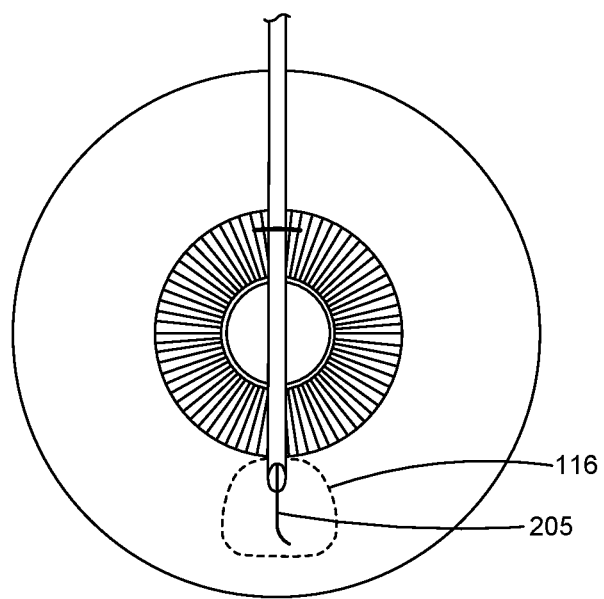
Figure 11:
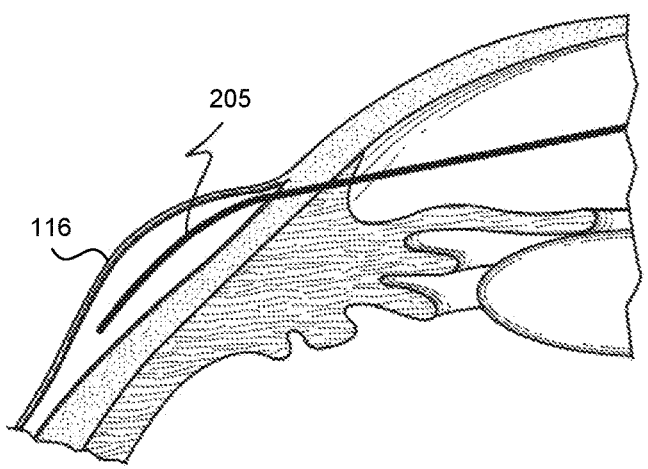
FIG. 11 illustrates the guidewire inserted into the bleb following removal of the introducer in accordance with embodiments of the present technology.

With the bleb space 116 stabilized, a guidewire 205 is threaded through the introducer 200 as a placeholder. FIGS. 10A and 10B, for example, illustrate inserting the guidewire 205 into the bleb space 116 via the introducer 200. Referring next to FIG. 11, the introducer 200 is withdrawn while the guidewire 205 remains in place. Following removal of the introducer 200, one end of the guidewire 205 resides in the bleb space 116, and the guidewire 205 threads back through the scleral tunnel and leads out of the corneal incision.

Figure 12A:
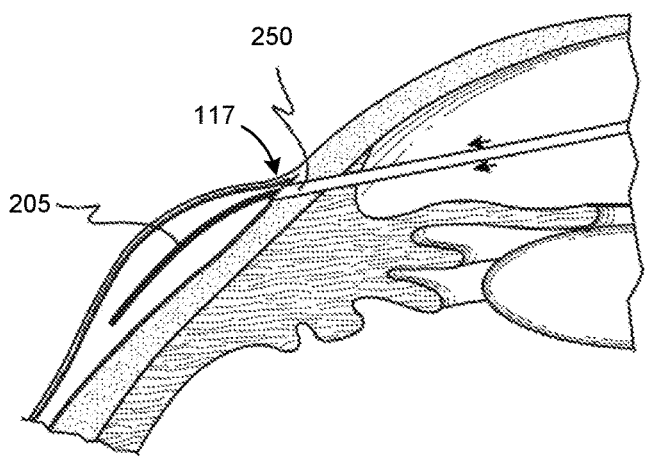
FIGS. 12A and 12B illustrate inserting a second introducer over the guidewire in accordance with embodiments of the present technology.
Figure 12B:
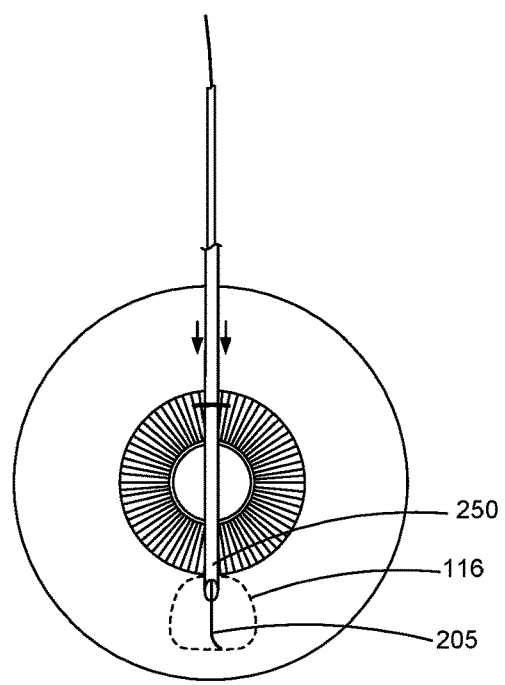

As shown in FIGS. 12A and 12B, a second introducer 250 containing the shunt (not shown) is threaded along the guidewire 205, entering through the same corneal incision. The introducer 250 is thus positioned at the established target implant site with its tip at the bleb entrance 117.

Figure 13:
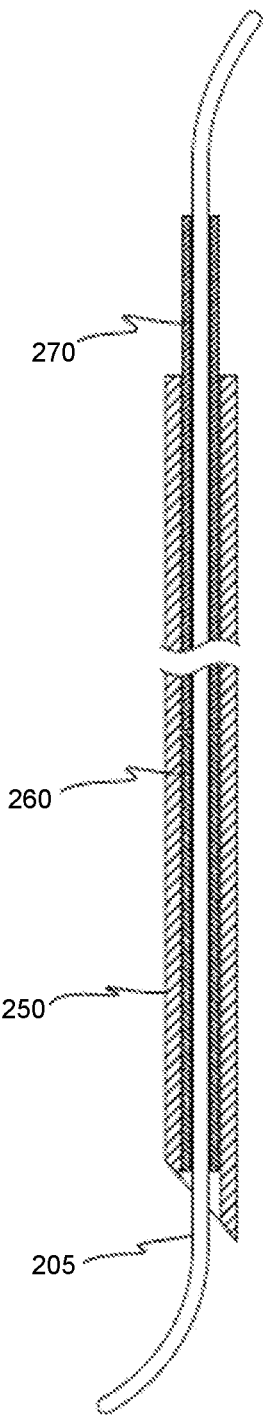
FIG. 13 is a cross-sectional view of the second introducer carrying a shunt and a pusher and configured in accordance with embodiments of the present technology.

FIG. 13 is a longitudinal cross-sectional view of the introducer 250 carrying a shunt 260. The shunt 260 is carried within an introducer lumen at a distal region of the introducer 250. The shunt 260 has a lumen through which the guidewire 205 is threaded. A pusher 270 also resides within the introducer 250 with the guidewire 205 threaded through its lumen. The pusher 270 is located proximal of the shunt 260 and can extend beyond the proximal end of the introducer 250.

Figure 14A:
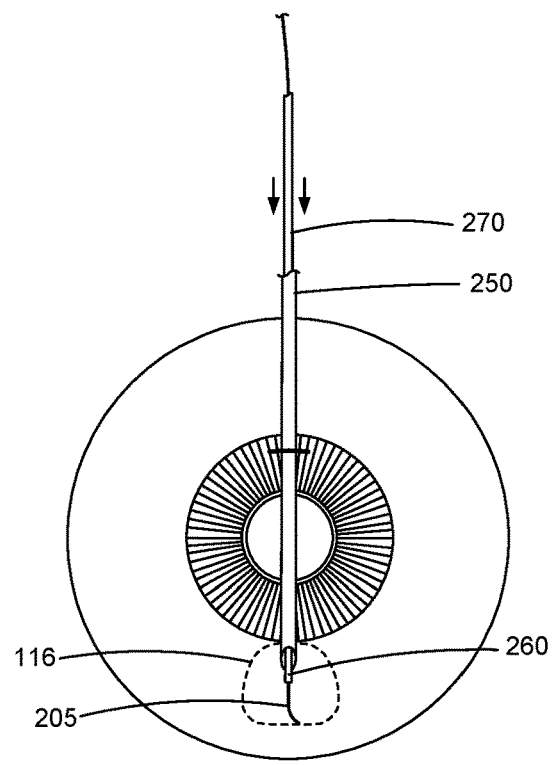
FIGS. 14A-14C illustrate using the pusher to eject the shunt from the second introducer in accordance with embodiments of the present technology.
Figure 14B:
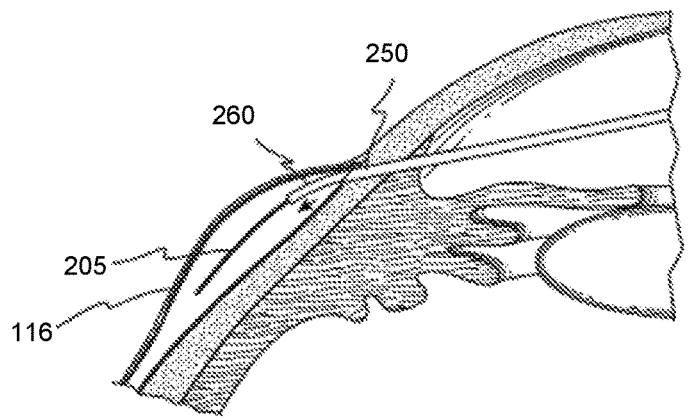
Figure 14C:
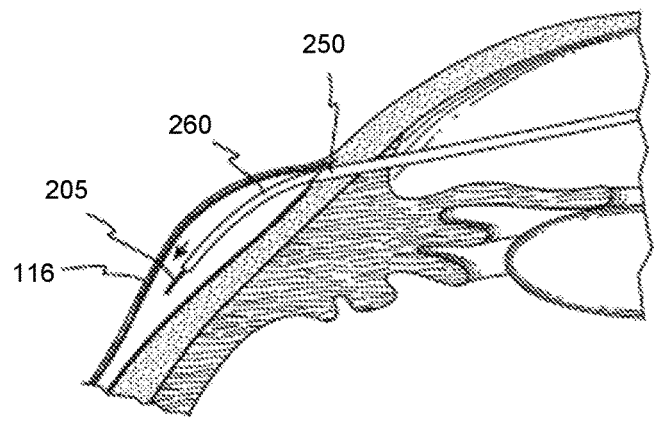

FIGS. 14A-16B illustrate one technique for deploying the shunt 260 within a patient. Referring first to FIGS. 14A-14C, an operator (not shown) may deploy the shunt 260 by advancing the pusher 270 further into the introducer 250, which causes the shunt 260 to advance out the distal end of the introducer 250.

Figure 15A:
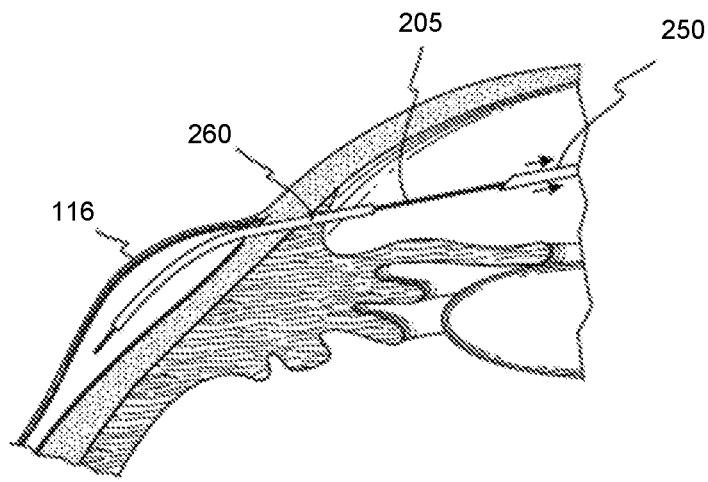
FIGS. 15A and 15B illustrate withdrawing the second introducer and pusher from the eye following insertion of the shunt in accordance with embodiments of the present technology.
Figure 15B:
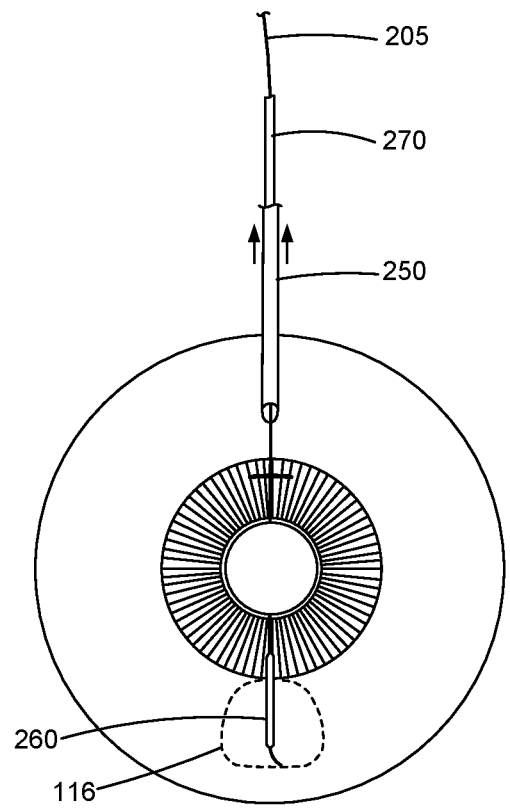
Figure 16A:
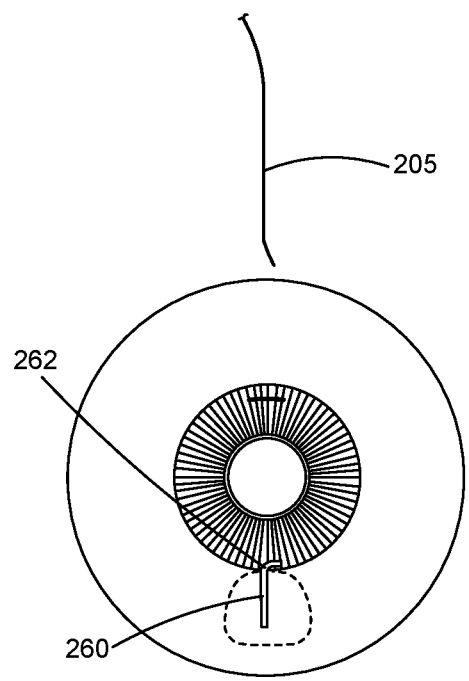
FIGS. 16A and 16B illustrate withdrawing the guidewire deploying the shunt in accordance with embodiments of the present technology.
Figure 16B:
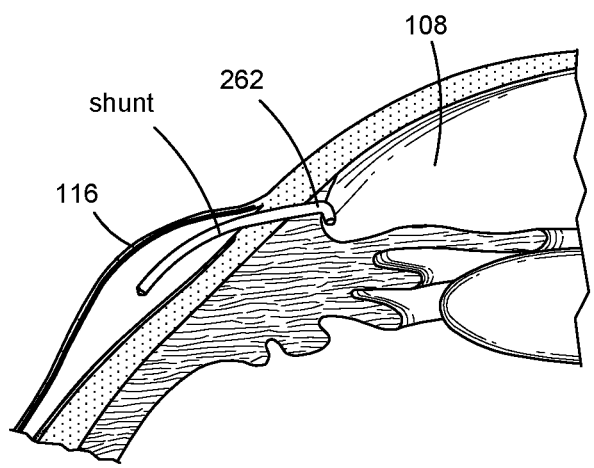

Referring next to FIGS. 15A and 15B, once the shunt 260 has been advanced sufficiently, the introducer 250 and pusher 270 are withdrawn. As shown in FIGS. 16A and 16B, after positioning of the shunt 260 is confirmed, the guidewire 205 is withdrawn. The distal end of the shunt 260 resides in the bleb space 116, and the proximal end resides in the anterior chamber 108. The shunt 260 is configured to fluidly connect the two spaces and allows for drainage of aqueous humor into the bleb space 116. In the illustrated embodiment, the proximal end of the shunt bends to create an elbow 262 or L-shaped configuration once the guidewire is removed. This feature is expected to reduce protrusion into the anterior chamber 108 and can help secure the shunt 260 position. Further details regarding this type of configuration are discussed below.

Multiple bending mechanisms and techniques are possible to create the L-shaped configuration. FIGS. 17A and 17B, for example, illustrate a first bending mechanism of a shunt 360 configured in accordance with select embodiments of the present technology. More specifically, FIGS. 17A and 17B illustrate a shunt 360 including a proximal end region 361 composed of a rigid material and a distal end region 363 composed of a flexible material. As best seen in FIG. 17B, the flexible material of the proximal end region can be preset to bend so that it assumes the L-shaped arrangement and defines the elbow 362 when the guidewire 205 is retracted/withdrawn.

FIGS. 18A and 18B illustrate a shunt 460 with a second, different bending mechanism. The shunt 460 illustrated in FIGS. 18A and 18B is composed of a shape memory material (e.g., nitinol or another suitable shape memory alloy) and set in an L-shaped configuration in its austenitic state. It is delivered down the guidewire 205 in a straight configuration. Once the guidewire 205 is removed, an external energy source (e.g., an ophthalmic laser 280) is utilized to deliver energy (e.g., heat) to one or more target locations on the shunt 460 and induce the shunt 460 to return to its L-shaped configuration, thereby defining elbow 462.

Figure 19A:
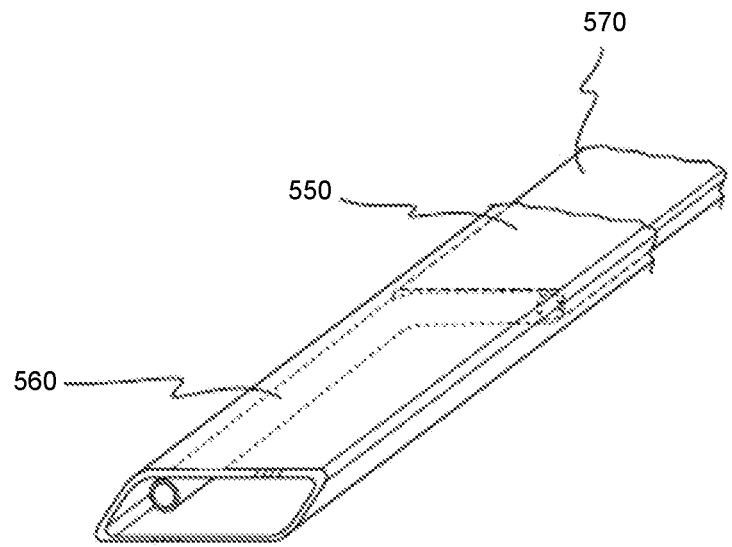
FIGS. 19A and 19B illustrate a shunt delivery system for delivering L-shaped shunts configured in accordance with embodiments of the present technology.
Figure 19B:
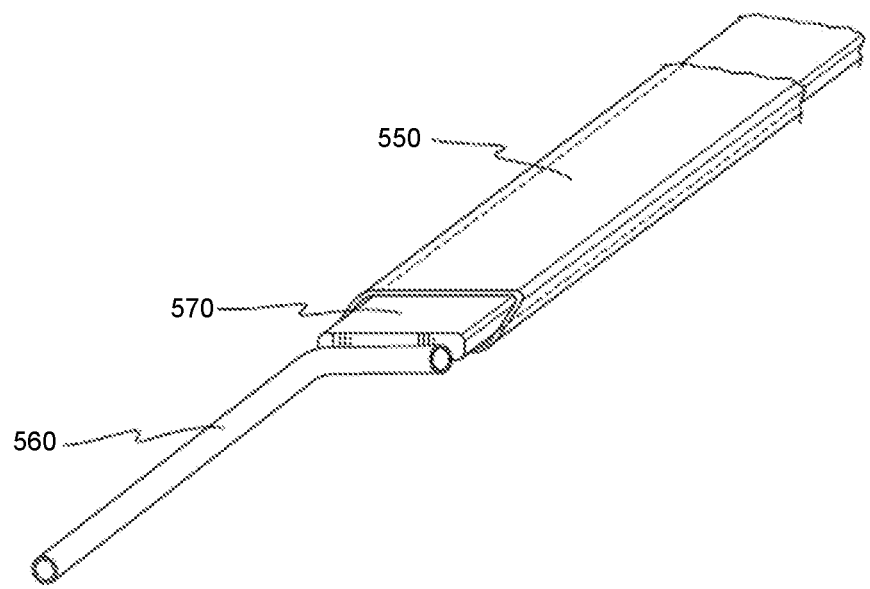

In further embodiments, a shunt may be initially deployed in an L-shaped configuration rather than being modified/transformed after deployment. FIGS. 19A and 19B, for example, illustrate a shunt delivery system for delivering a preformed L-shaped shunt 560 in accordance with an embodiment of the present technology. For sake of illustration and simplicity, the guidewire is omitted in FIGS. 19A and 19B. In this embodiment, a modified introducer 550 and push rod 570 with a rectangular cross-sectional profile is used for introducing the L-shaped shunt 560.

FIGS. 20A and 20B illustrate an L-shaped shunt 660 configured in accordance with another embodiment of the present technology. Referring first to FIG. 20A, guidewire 205 is threaded through an elbow 662 of the shunt 660. In this embodiment, the shunt 660 includes an elbow hole or aperture 664 positioned to allow guidewire access for delivery of the shunt 660 to a target site in the patient (not shown). Once at the target site, the guidewire 205 may be withdrawn (FIG. 20B).

Figure 21A:
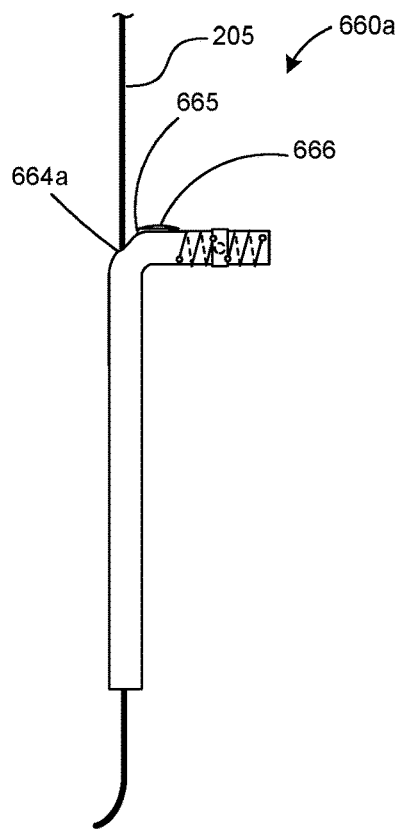
FIGS. 21A-21D illustrate a method for closing a guidewire access port on an L-shaped shunt configured in accordance with embodiments of the present technology.
Figure 21B:
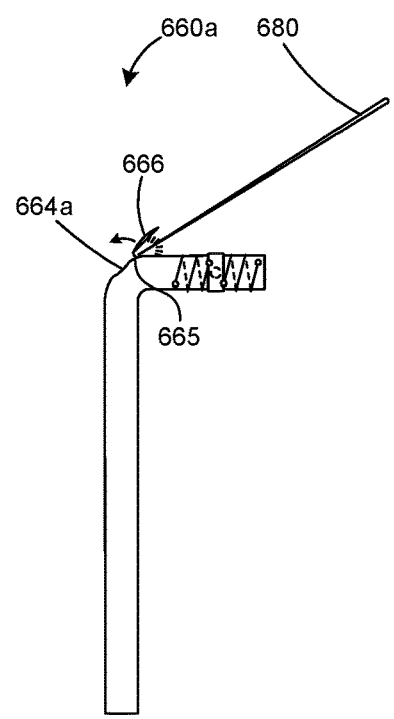
Figure 21C:
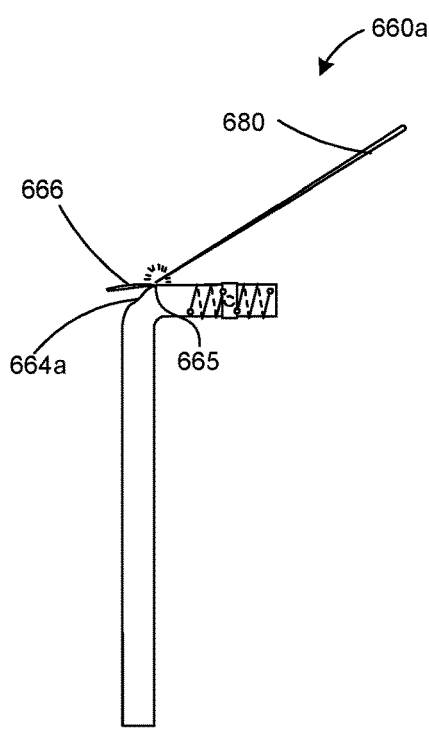
Figure 21D:
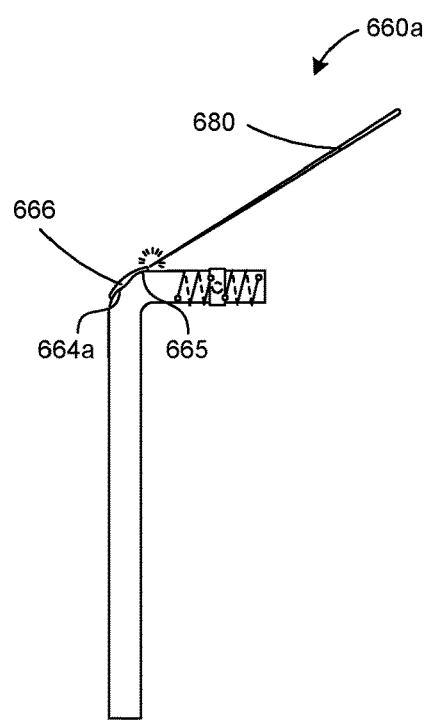

In some embodiments, the shunt may include a guidewire access port positioned to provide/inhibit access for the guidewire. FIGS. 21A-21D, for example, illustrate an L-shaped shunt 660a including such an access port or aperture 664a configured in accordance with an embodiment of the present technology. The shunt 660a comprises a cap 666 positioned to pivotably move (via hinge 665) between (a) a first or open position relative to the access port 664a (as shown in FIG. 21A) and (b) a second or closed position relative to the access port 664a (as shown in FIG. 21D) once the guidewire 205 is removed. For example, as shown in FIGS. 21B and 21C, to close the access port 664a once the guidewire 205 has been removed, the hinge 665 can be selectively actuated by applying energy directly or indirectly (e.g., via ophthalmic laser excitation 680 from an energy source positioned external to the eye) to the hinge 665. Such energy delivery causes the hinge 665 to transition from a first phase/state to a second, different phase state, thereby pivotably moving the cap 666 to the second or closed position relative to the access port 664a (FIG. 21D). In other embodiments, the cap 666 may have a different arrangement relative to the access port 664a and may have a different actuation mechanism.

The delivery mechanism for pre-formed L-shaped shunts (such as the shunts described above with reference to FIGS. 19A-21D) can be substantially similar to the delivery process as described above with reference to FIGS. 13-16B. FIG. 22A, for example, is a longitudinal cross-sectional view of the modified introducer 550 carrying an L-shaped shunt 760. As with many of the other shunts discussed herein, shunt 760 comprises a lumen through which the guidewire 205 is threaded. Push rod 570 also resides within the modified introducer 550. The push rod 570 is located proximal of the shunt 760 and can extend beyond the proximal end of the introducer 550. Referring next to FIGS. 22B-22D, an operator (not shown) may deploy the shunt 760 by advancing the push rod 570 further into the modified introducer 550, which causes the shunt 760 to advance out the distal end of the introducer. Once the shunt 760 has been advanced sufficiently into the bleb 116, the modified introducer 550 and push rod 570 are withdrawn. As shown in FIG. 22D, after positioning of the shunt 760 is confirmed, the guidewire 205 is withdrawn. The distal end of the shunt 260 resides in the bleb space 116, and the proximal end resides in the anterior chamber. It will be further appreciated that one or more of the steps here for delivering the L-shaped shunt 760 may be modified/changed to accommodate different shaped shunts and/or differing anatomy of the patient.

FIGS. 23A and 23B illustrate a variable flow glaucoma shunt 860 configured in accordance with another embodiment of the present technology. The shunt 860 includes a proximal inflow control assembly 872 and a distal outflow tube or outflow assembly 874. The proximal inflow control assembly 872 is configured to reside, for example, in an anterior chamber 108 (FIG. 1) of a patient, and the distal outflow tube or outflow assembly 874 is configured to reside, for example, at least partially within the bleb space 116 (FIG. 1).

The inflow control assembly 872 includes a control element 873 (e.g., slat) positioned over one or more apertures or openings 875 (shown in broken lines) extending through a body portion of the inflow control assembly 872. The aperture(s) 875, when at least partially exposed, are configured to allow aqueous to flow therethrough and into the outflow tube 874. As best seen in FIGS. 23A and 23B, the shunt 860 also comprises a pair of adjustable actuation elements 876a, 876b arranged on opposite sides of the control element 873. The actuation elements 876a, 876b are coupled between the body portion of the shunt 860 and the control element 873. In some embodiments, the actuation elements 876a, 876b are wire springs composed of a shape memory material (e.g., nitinol) and adapted to expand/contract when heat is applied. For example, applying heat 880 (e.g., via an ophthalmic laser positioned external to the patient) to a first actuation element 876a (i.e., on the left side of the slat) can induce this element to coil more tightly, thereby moving the control element 873 toward the first actuation element 876a and stretching or expanding the second actuation element 876b. Moving the control element 873 also at least partially exposes the aperture(s) 875 to allow aqueous to flow therethrough. Likewise, applying heat 880 to the second actuation element 876b (i.e., on the right side of the slat) can induce this actuation element 876b to coil more tightly and move the control element 873 (e.g., slat) back toward the proximal end of the shunt 860, thereby again minimizing exposure of or completely covering the aperture(s) 875. This back and forth modulation of the control element 873 (e.g., slat) position may be utilized to reveal or obstruct the flow aperture(s) 875, and thereby selectively adjust the flow of aqueous humor.

Figure 24A:
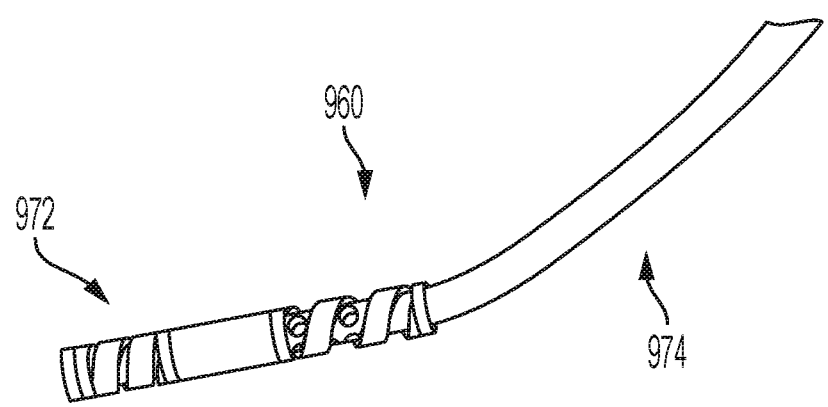
FIGS. 24A and 24B illustrate an adjustable flow shunt configured in accordance with embodiments of the present technology.
Figure 24B:
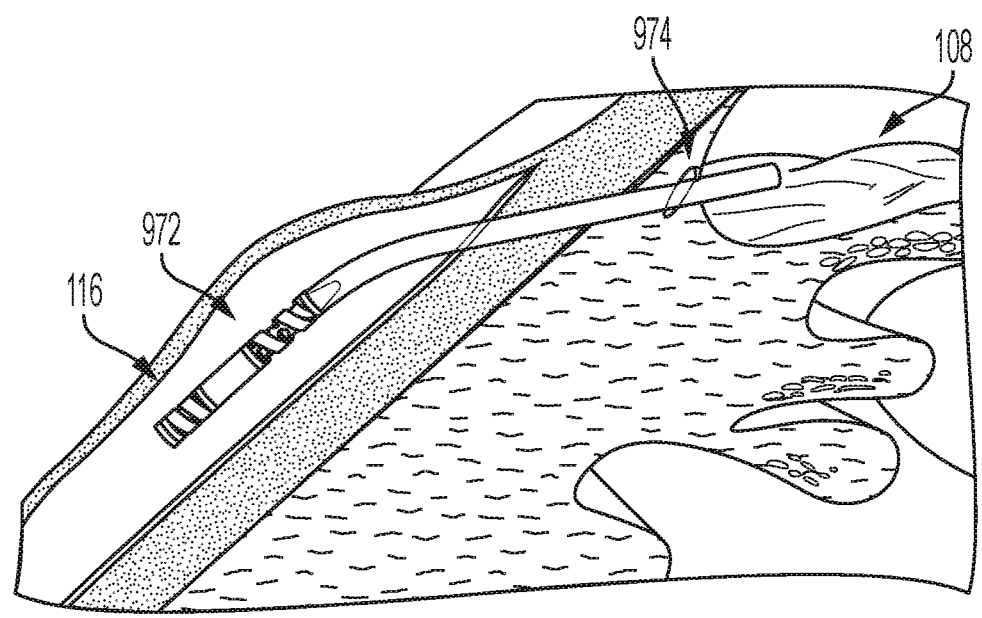

FIGS. 24A and 24B illustrate a variable flow glaucoma shunt 960 configured in accordance with still another embodiment of the present technology. Unlike the embodiments described above with respect to FIGS. 23A and 23B, the variable flow glaucoma shunt 960 includes a flow control assembly adjacent to an outflow region of the shunt (i.e., at a downstream end region). More specifically, the variable flow glaucoma shunt 960 includes an outflow control assembly 972 and an inflow tube 974. As best seen in FIG. 24B, when deployed in a patient, the outflow control assembly 972 of the shunt 960 is configured to reside at least partially within the bleb space 116, and the inflow tube 974 is configured to reside at least partially within the anterior chamber 108. The outflow control assembly 972 can selectively control the flow of aqueous humor from the anterior chamber 108 to the bleb space 116 in a substantially similar manner as described with respect to FIGS. 23A-B, except that the flow control mechanism is positioned on the downstream end region of the shunt 960 within the bleb space 116. The orientation of the variable flow glaucoma shunt 960 can be useful, for example, for devices implanted using an ab-externo implant procedure. In such embodiments, the bleb space 116 can be formed in a subconjunctival space beneath a subconjunctival sub-Tenons flap. In some embodiments, the shunts and systems of the present technology may be similar in certain respects to those described in PCT Publication No. WO 2019/018807, filed on Jul. 20, 2019, which is incorporated herein by reference in its entirety.

Examples

Several aspects of the present technology are set forth in the following examples.

1. A device for forming a bleb to treat ocular hypertension or glaucoma in a human patient, the device comprising:
  an introducer sheath having a lumen extending longitudinally therethrough, the lumen having a distal end aperture insertable adjacent to a target tissue within an eye of the patient; and
  a wire positionable within the lumen, the wire having a first end segment, a second end segment, and an intermediate segment between the first end segment and the second end segment,
  wherein, during operation, (a) at least a portion of the first end segment and a portion of the second end segment reside within the lumen, and (b) at least a portion of the intermediate segment extends through the distal end aperture to define a wire loop,
  wherein the wire loop is configured to disrupt and cauterize the target tissue of the patient.

2. The device of example 1 wherein the lumen has a proximal end aperture, and wherein the first end segment and the second end segment of the wire extend through the proximal end aperture.

3. The device of example 1 or 2 wherein pulling the first end segment of the wire moves the wire loop laterally in a first direction, and wherein pulling the second end segment of the wire moves the wire loop laterally in a second direction.

4. The device of example 3 wherein the wire loop is configured to disrupt the target tissue to form a bleb by moving laterally in the first direction and laterally in the second direction.

5. The device of any of examples 1-3 wherein the wire loop is configured to be agitated in multiple directions to disrupt the target tissue.

6. The device of any of examples 1-5 wherein the wire loop is configured to disrupt the target tissue via a mechanical force.

7. The device of any of examples 1-6 wherein the device is configured to be in electrical communication with an energy generator external to the patient.

8. The device of any of examples 1-7 wherein the wire loop is configured to deliver electrical energy to cauterize the target tissue.

9. The device of any of examples 1-8 wherein the first end segment and the second end segment of the wire are insulated.

10. The device of any of examples 1-9 wherein the target tissue is a subconjunctival space in the eye of the patient.

11. The device of any of examples 1-9 wherein the target tissue is subconjunctival tissue either above or below the capsule of tenons in the eye of the patient.

12. A method of forming a bleb in the treatment of ocular hypertension or glaucoma, the method comprising:
    inserting an introducer sheath into an eye of a human patient such that a distal end of the introducer sheath is adjacent a target tissue of the patient, wherein the introducer sheath includes a lumen extending longitudinally therethrough;
    deploying a wire through the lumen to contact the target tissue,
        wherein the wire includes a first end segment, a second end segment, and an intermediate segment between the first end segment and the second end segment, and wherein (a) at least a portion of the first end segment and a portion of the second end segment are in the lumen, and (b) at least a portion of the intermediate segment extends through a distal end aperture to form a wire loop in contact with the target tissue;
    disrupting tissue in the target tissue via the wire loop to form the bleb; and
    cauterizing the disrupted target tissue by applying an electrical current to the disrupted target tissue via the wire loop.

13. The method of example 12 wherein disrupting the tissue comprises applying a pulling force on the first end segment and/or the second end segment of the wire.

14. The method of example 12 or 13 wherein pulling the first end segment moves the wire loop laterally in a first direction, and wherein pulling the second end segment moves the wire loop laterally in a second direction.

15. The method of any of examples 12-14 wherein the lumen has a proximal end aperture, and wherein the first end segment and the second end segment of the wire extend through the proximal end aperture.

16. The method of any of examples 12-15 wherein the wire loop is in electrical communication with a current generator.

17. The method of any of examples 12-16 wherein the first end segment and the second end segment are insulated.

18. The method of any of examples 12-16, further comprising treating the cauterized tissue with an anti-scarring agent.

19. The method of example 18 wherein the anti-scarring agent is inserted into the bleb through the lumen.

20. The method of any of examples 12-19, further comprising flushing the bleb with saline after disrupting the tissue.

21. The method of any of examples 12-20 wherein the target tissue is a subconjunctival space within the eye of the patient.

Conclusion

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, any of the features of the variable flow shunts described herein may be combined with any of the features of the other variable flow shunts described herein and vice versa. Moreover, although steps are presented in a given order, alternative embodiments may perform steps in a different order. The various embodiments described herein may also be combined to provide further embodiments.

Although the bleb technique is shown and described as generally an ab-interno procedure, one will appreciate from the description herein that the techniques and devices may be applied to an ab-externo procedure.

From the foregoing, it will be appreciated that specific embodiments of the technology have been described herein for purposes of illustration, but well-known structures and functions associated with variable flow shunts have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method of forming a bleb in the treatment of ocular hypertension or glaucoma, the method comprising:
   inserting an introducer sheath into an eye of a human patient such that a distal end of the introducer sheath is adjacent a target tissue of the patient, wherein the introducer sheath includes a lumen extending longitudinally therethrough;
   deploying a wire through the lumen to contact the target tissue,
      wherein the wire includes a first end segment, a second end segment, and an intermediate segment between the first end segment and the second end segment, and wherein (a) at least a portion of the first end segment and a portion of the second end segment are in the lumen, and (b) at least a portion of the intermediate segment extends through the distal end aperture to form a wire loop in contact with the target tissue;
   moving the wire loop laterally relative to the introducer sheath to mechanically disrupt tissue in the target tissue to form the bleb;
   after mechanically disrupting the tissue, expanding the wire loop; and
   delivering electrical current to the disrupted tissue via the expanded wire loop to cauterize the disrupted target tissue.

2. The method of claim 1 wherein disrupting the tissue comprises applying a pulling force on the first end segment and/or the second end segment of the wire.

3. The method of claim 2 wherein pulling the first end segment moves the wire loop laterally in a first direction, and wherein pulling the second end segment moves the wire loop laterally in a second direction.

4. The method of claim 1 wherein the lumen has a proximal end aperture, and wherein the first end segment and the second end segment of the wire extend through the proximal end aperture.

5. The method of claim 1 wherein the wire loop is in electrical communication with an energy generator positioned external to the patient.

6. The method of claim 1 wherein the first end segment and the second end segment are insulated.

7. The method of claim 1, further comprising treating the cauterized tissue with an anti-scarring agent.

8. The method of claim 7 wherein the anti-scarring agent is inserted into the bleb through the lumen.

9. The method of claim 1, further comprising flushing the bleb with saline after disrupting the tissue.

10. The method of claim 1 wherein the target tissue is a subconjunctival space within the eye of the patient.

\* \* \* \* \*